Patented Dec. 21, 1926.

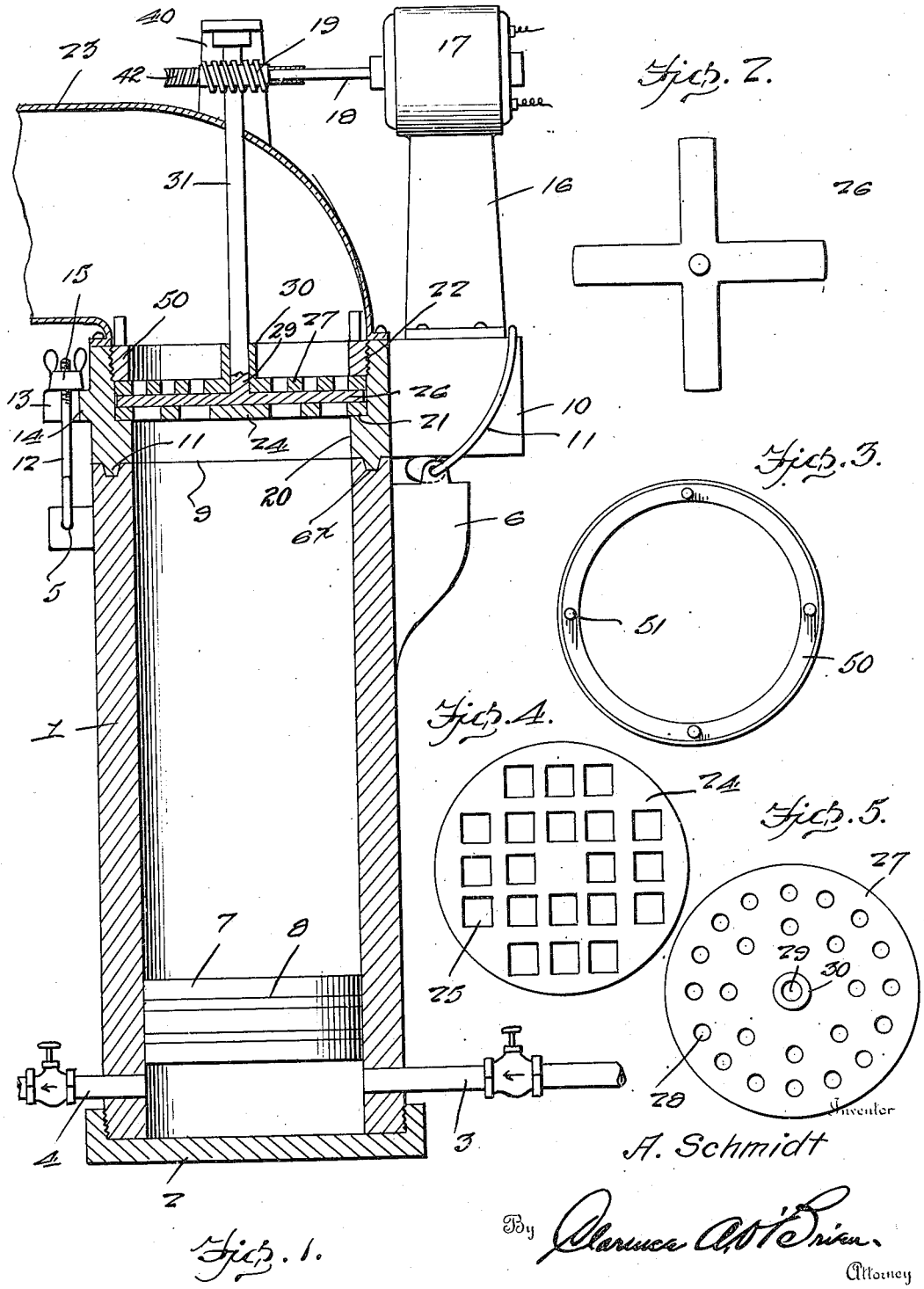

1,611,244

UNITED STATES PATENT OFFICE.

ALBERT SCHMIDT, OF ROYAL OAK, MICHIGAN.

MEAT GRINDER.

Application filed November 5, 1925. Serial No. 67,000.

My present invention pertains to meat grinders and it has for a general object the provision of a meat grinder of simple and inexpensive construction, and one that is efficient in operation and is susceptible of being readily fed and is also adapted to be thoroughly cleaned when necessity demands, with facility.

To the attainment of the foregoing, the invention consists in the improvement as hereinafter described and definitely claimed.

In the accompanying drawings, forming part of this specification:—

Figure 1 is a view partly in vertical section and partly in elevation of the grinder constituting the preferred embodiment of my invention.

Figure 2 is a plan view showing the knife of the grinder.

Figure 3 is a detail top plan of the annular retaining nut.

Figure 4 is a top plan of the lower foraminous disk.

Figure 5 is a top plan view of the upper foraminous disk comprised in the improvement.

Similar numerals of reference designate corresponding parts in all of the views of the drawings.

In the illustrated preferred embodiment of my invention, I employ fluid under pressure for the movement of the body of meat to the cutting means, and therefore said embodiment comprises among other elements a body cylinder 1 having a detachable closure 2, by preference, at its lower end, and equipped with a valved inlet 3 for steam, air or any other appropriate fluid under pressure, and also equipped at 4 with a valved outlet. Lugs 5 and 6 are provided exteriorly on the cylindrical body 1 adjacent to the upper end thereof, and in said upper end the body 1 is provided with an annular channel 6ˣ.

Movable in the cylindrical body 1 under the impetus of fluid under pressure and also by reason of gravity is a follower 7 the periphery of which is preferably packed as designated by 8 so as to preclude the leakage of fluid under pressure to the body of meat which is placed in the cylindrical body 1 through the upper open end 9 thereof.

In addition to the cylindrical body 1, my improvement comprises a crown member 10 superposed on and removable from the cylindrical body and having a pendent annular flange 11 disposed in the before mentioned channel 6ˣ so as to break the joint between the body 1 and the crown member 10 and thereby preclude the exudation of meat from the cylindrical body 1 when the meat is held by strong pressure against the cutting means.

Any appropriate means may be employed for the detachable retention of the crown member 10 on the cylindrical body 1 without affecting my invention. I prefer, however, to employ for the purpose a swingable bail 11 on the lug 6 and adapted to take over one end of the member 10 and to be displaced from said end, and a bolt 12, swingably connected to the lug 5 and movable into and out of a kerf 13 in a lug 14 on the crown member 10, and carrying above the said lug 14 a clamping nut 15 preferably, though not necessarily, of the wing type.

A standard 16 is fixed with respect to and rises from the crown member 10 and carries at its upper end a conventional or other suitable electric motor 17, the armature shaft 18 of which is equipped with a worm 19, arranged above and in spaced relation to the member 10.

Interiorly the crown member 10 is provided with an annular opening 20 which extends throughout the height thereof and is designed to be registered with the bore of the cylindrical body 1. It will also be noted that the crown member 10 is provided with an interior ledge 21 and with an interior thread 22, the threaded portion 22 being above and in spaced relation to the ledge 21.

A conduit 23, preferably of appropriate sheet metal, is connected at one end in superposed relation to the crown member 10 about the opening 20 therein, and is carried laterally for the conduct of the ground meat to a point at one side of the grinder.

In Figure 4, I show the lower foraminous disk 24, said disk being comprised in the organized grinding mechanism, and being provided with apertures 25 of square form. Movable above the said disk 24 is a knife 26 which is preferably, though not necessarily, cruciform as shown in Figure 2, and above the said knife 26 is an upper disk 27 preferably with comparatively small circular apertures 28. In practice the knife 26 will be preferably ground at both sides, the lower disk 24 at its upper side only, and the upper disk 27 at its lower side only. The upper disk 27 is provided with an aperture 29 and a boss 30 for the passage of the shaft 31 which is integral with or fixed with respect to the knife 26 and extends upwardly through the conduit 23, and has its end portion journaled in and extended upwardly through a bearing member 40, superposed on and fixed to the conduit 23. Appropriately keyed on the shaft 31 is a worm gear 42 in mesh with the worm 19, the described keying of the worm gear 42 on the shaft 31 being preferably effected in such manner as to permit of vertical movement of the shaft 31 and the knife 26.

The annular retaining nut 50, Figures 1 and 3, is exteriorly threaded to engage the thread 22 of the crown member 10, and is provided with a plurality of upstanding projections 51 said projections 51 being designed to facilitate turning of the nut 50 in the assembly or disassembly of the elements included in the cutting means, and in this connection it will be noted that when deemed necessary, all of the elements of the cutting means may be readily and thoroughly cleaned.

It will be readily understood from Figure 1 that an important characteristic of my novel grinder resides in the fact that the meat does not at any time come in contact with a gear or gearing. On the other hand the movement of the meat in the cylindrical body 1 and through the organized grinding mechanism, and in comminuted state after leaving said grinding mechanism is entirely clear of gears or any other feature liable to deteriorate the meat.

Manifestly when the crown member 10 is removed from the body 1, meat may be placed in the said body 1 above the follower 7, and then the crown member 10 may be readily replaced on and detachably fastened to the body, so that when the motor 17 is started, and fluid under pressure is let into the body 1 below the follower 7, the said follower 7 will operate to force the meat strongly and evenly through the organized grinding mechanism, and will also operate to steadily feed the comminuted meat through the conduit 23 to an appropriate point of discharge.

Notwithstanding the efficiency of my novel grinder, and the several practical advantages ascribed to the grinder, it will be noted that the grinder as a whole is simple and compact in construction, is not unduly expensive, and in all respects is well adapted to withstand the usage to which meat grinders and the like are ordinarily subjected.

I have entered into a detailed description of the disclosure herein in order to impart a full, clear and exact understanding of said disclosure in all of its details. I do not desire, however, to be understood as confining myself to the specific construction and relative arrangement of parts as shown and described, my invention being defined by my appended claims within the scope of which changes in structure and in arrangement of parts may be made without departure from my invention.

Having described my invention, what I claim and desire to secure by Letters-Patent, is:—

1. In a meat grinder and in combination, hollow holding means closed at one end and open at its opposite end, a follower movable in said holding means, an organized grinding mechanism located in the holding means adjacent to the open end thereof and including a rotary knife and having passages in line with the plane of traverse of the follower, a conduit in communication with the open end of the holding means and extending laterally with respect to said holding means, and a shaft connected with said rotary knife and extending through said conduit, whereby said shaft may be rotated by power applied exteriorly of the conduit.

2. In a meat grinder and in combination, hollow holding means closed at one end and open at its opposite end, a follower movable in said holding means, an organized grinding mechanism located in the holding means at one side of the follower and having passages in line with the plane of traverse of the follower, and a crown closure member forming part of the said holding means, and opposed to and detachably connected with the remainder of the holding means and carrying said organized grinding mechanism and equipped with a lateral conduit.

3. In a meat grinding and in combination, a body, means in said body for feeding meat, a crown member opposed to and breaking joints with the body and detachably connected therewith, said crown member having an opening therethrough in registration with the bore of the body and also having a ledge in said opening and an interior thread spaced from said ledge, a foraminous disk opposed to said ledge, a rotary knife opposed to said disk, a second foraminous disk arranged at the opposite side of the knife to the first-named disk, an annular nut engaging the thread of the crown member and opposed to the outer foraminous disk, a conduit in communication with the opening in the crown member and carried by said crown member and disposed laterally relative to the body, a shaft carrying said knife and extending through said conduit to a point at the outer side thereof and opposite the body, and means exterior of said conduit for transmitting rotary motion to said shaft.

4. In a meat grinder and in combination, hollow holding means open at one end and having a groove in said end and also having opposite lugs, a swingable bail on one lug, a swingable bolt on the other lug and equipped with a nut, a crown member having a rib to enter said groove of the holding means and also having a portion for the engagement of said bail and a kerfed lug to receive said swingable bolt, an organized grinding mechanism carried in said crown member, said grinding mechanism including a rotary cutter, and means also carried by the crown member for rotating said cutter.

In testimony whereof I affix my signature.

ALBERT SCHMIDT